Patented Oct. 18, 1932

1,883,412

UNITED STATES PATENT OFFICE

GEORGE SCHNEIDER, OF CUMBERLAND, MARYLAND, ASSIGNOR TO CELANESE CORPORATION OF AMERICA, A CORPORATION OF DELAWARE

APPLICATION OF CELLULOSE ESTERS AND ETHERS

No Drawing. Application filed July 23, 1926. Serial No. 124,544.

An object of this invention is to apply a coating or film of a cellulose ester or ether upon an object, film, etc. containing or substantially composed of a cellulose ester or ether. The object which is to be coated may or may not be of the same composition as the ester or ether which is used as the coating medium. Another object of this invention is to provide a means for protecting finishes, effects, etc. which are affected by atmospheric conditions or are readily removed by friction. Another object of this invention is to provide a process for producing iridescent effects on films, fabrics, etc.

Heretofore it has been impossible to obtain or preserve certain valuable effects on films, fabrics, etc. because these effects were affected by moisture or easily removed by light abrasions. The applicant has discovered that these valuable effects can be preserved by coating the same with a solution of a cellulose ester or ether, such as, for example, cellulose acetate. The solvent used in preparing this solution will depend upon the cellulose ester or ether which forms the base of the film, fabric, etc. upon which it is desired to create or preserve the effect. The solvent used should be one which will have no effect upon this base. Thus filaments of artificial silk or films composed of cellulose acetate or any other cellulose ester or ether, which is soluble in acetone but insoluble in chloroform and/or ethyl acetate, can be coated with a cellulose acetate or any other cellulose ester or ether which is soluble in chloroform and/or ethyl acetate.

The necessity of a coating or coatings such as the above may be due, among others, to any or several of the following reasons. The films or filaments may be composed of a cellulose ester or ether which is more or less hygroscopic and consequently has the undesirable property of showing marks when sprinkled with water (spotting). A coating with a cellulose ester or ether which is not hygroscopic overcomes this difficulty, eliminating the spotting of the films or filaments thus treated. Also it is sometimes desirable to produce a film or thread having a metallic, colored or other novelty effect. In this case the coating solution would contain pigment, powdered metal, dyestuffs or other effect materials depending upon the result desired. Likewise where metallic effects on films, etc. are obtained by rubbing crystals of certain metallic salts on the film, etc. the coatings can be protected against removal by light abrasions if a coating of a cellulose ester or ether is applied over the rubbed-in crystals. The metallic effect thus obtained is rendered permanent without losing any of its desirable properties.

In carrying out my invention a base of nitrocellulose in the form of film, etc. may be coated with a solution of a methyl, ethyl or benzyl ether of cellulose in a solvent which is a non-solvent for the nitrocellulose such as benzene of toluene or with a solution of cellulose butyrate or proprionate in benzene. In like manner a base of any ester or ether may be coated with a solution of any ester or ether of cellulose provided that the solvent used in preparing the solution is a non-solvent for the ester or ether which forms or is present in the base.

By virtue of the fact that it is possible to prepare the same ester of cellulose in several phases of different solubilities, it is possible, as a result of this process, to have, for example, a base of cellulose acetate which is soluble in acetone but insoluble in chloroform or ethyl acetate and coating of cellulose acetate which is soluble in chloroform or ethyl acetate. It is thus possible to have the coating and the base of the same ester, each having different properties. The various esters and ethers, with different solubilities, can be prepared at will in accordance with methods well known in the art of manufacturing cellulose compounds, such as variation in the degree of reaction and/or variation in the degree and period of hydrolysis.

The following examples illustrate a few methods of utilizing my invention:

*Example 1.*—For the production of a permanent metallic effect on fabrics, films, leather, wood articles etc. A dark, highly polished surface is first produced by coating a fabric etc. with a cellulose acetate solution in acetone, preferably dyed black with sp. sol. nigrosine. The cellulose acetate used, while soluble in acetone is insoluble in ethyl acetate and insoluble or only very slightly softened by chloroform. The dark surfaced fabric is given a metalic effect by thoroughly rubbing the same with fine crystals of bismuth or antimony oxychlorides. The metallic effect thus obtained, however, has the drawback that it is very easily removed by rubbing. This difficulty can be overcome and the metallic effect rendered permanent by coating the same with a clear undyed solution of a cellulose acetate which is soluble and dissolved in ethyl acetate and/or chloroform. Since the solvent used in the coating solution has no effect upon the cellulose acetate of the base, the coating solution has no effect upon the cellulose acetate of the base, the coating solution dries as a tough protecting coat without in any way marring the highly polished surface having the metallic effect thereon. This would not be possible if the solvent used for the protective coating were also a solvent for the base.

*Example 2.*—For the production of an iridescent silvery metallic effect on fabrics, films, articles, etc. The procedure in this case is identical to that of Example 1 except for the fact that the protective coating, instead of being applied as one film of appreciable thickness is applied as several successive coatings of a very dilute solution of the ester, the solvent of the solution being a non-solvent of the base. These numerous thin coatings produce a beautiful iridescence, due to the refraction of light, instead of the plain metallic effect obtained in Example 1. These numerous coatings, however, also serve as a permanent protection for the underlying effect materials the same way as does one single film of appreciable thickness.

*Example 3.*—For the production of threads, fabrics, etc., of cellulose acetate artificial silk having metallic effects. Filaments or fabrics etc., of cellulose acetate artificial silk are treated with a dilute solution of a cellulose ester or ether containing finely ground bronze or other metallic powders, the cellulose ester or ether being dissolved in benzene which is a non-solvent for the cellulose acetate of the filaments. Benzene being very volatile evaporates very rapidly leaving behind the cellulose ester or ether with the powdered bronze, etc., as the coating for the cellulose acetate filaments.

*Example 4.*—For the production of spot-proof artificial patent leather. Artificial patent leather which is produced in accordance with the process outlined in U. S. application 110,826, filed May 21st, 1926, and which consists of a highly polished surface of a cellulose ester on fabric, paper or a suitable leather base, may, if prepared from a highly hydrated cellulose ester, such as hydrated cellulose acetate become spotted by the action of drops of water. This property can be economically and speedily overcome by applying to this hydrated cellulose ester a thin coating of an unhydrated or very slightly hydrated acetate solution. This unhydrated cellulose acetate must be dissolved in a solvent, such as chloroform, ethyl acetate, etc. which is a non-solvent for the ester forming the base (artificial patent leather). Thus an artificial patent leather can be obtained which has all the desirable properties of a hydrated cellulose ester and the non-spotting property of an unhydrated cellulose ester.

The operation of my invention is not limited to the foregoing examples but is capable of a variety of modifications. The esters and ethers mentioned in the foregoing examples may be wholly or partially replaced by other esters or ethers. Also the esters or ethers used for the coating may be used for the base and vice versa, an essential feature being the selection of a solvent for the coating ester or ether which is a nonsolvent for the ester or ether present in the base. However only such cellulose derivatives as are stable under atmospheric conditions and which need not be stabilized or converted into a stable compound can be used. Thus cellulose xanthogenate which decomposes very readily and which must be reconverted into cellulose before it can be utilized in the arts cannot be employed and is not embraced within the scope of this invention. Beautiful and durable effects are obtainable by incorporating with the coating solution metal powders, fish scale, pigments, dyes and/or other effect materials. Also pleasing and desirable effects are obtainable by preparing the surface of an article or object composed of or containing a cellulose ester or ether with the desired effect in non-permanent form and protecting the latter by coating it with a cellulose ester or ether dissolved in a solvent which is a non-solvent for the base. Included within the term "effect materials" are dyes, dyestuffs, pigments, metallic powders, metallic and other effect materials.

Having described my invention what I claim and desire to secure by Letters Patent is:—

An article of manufacture comprising a base containing acetone soluble cellulose acetate with crystals of bismuth oxychloride thereon to give it a metallic effect, over which a transparent protective layer of chloroform soluble cellulose acetate is superimposed.

In testimony whereof, I have hereunto subscribed my name.

GEORGE SCHNEIDER.